United States Patent [19]
Juday

[11] Patent Number: 5,212,233
[45] Date of Patent: May 18, 1993

[54] POLYMERIZABLE LIQUID SEALANTS FOR IMPREGNATING CAST METAL AND POWDERED METAL ARTICLES

[75] Inventor: Thomas W. Juday, Elm Grove, Wis.

[73] Assignee: Imprex, Inc., Milwaukee, Wis.

[21] Appl. No.: 723,016

[22] Filed: Jun. 28, 1991

Related U.S. Application Data

[62] Division of Ser. No. 377,352, Jul. 10, 1989, Pat. No. 5,097,743.

[51] Int. Cl.$^5$ .......................... C08F 36/00; C08F 36/20
[52] U.S. Cl. ........................................ 525/36; 525/39; 525/48
[58] Field of Search ............................. 525/36, 39, 48

[56] References Cited

U.S. PATENT DOCUMENTS

| | | | |
|---|---|---|---|
| Re. 32,240 | 9/1986 | DeMarco | 526/328 |
| 2,772,185 | 11/1956 | Dempster | 117/102 |
| 3,672,942 | 7/1972 | Neumann et al. | 117/62.2 |
| 3,969,552 | 7/1976 | Malofsky et al. | 427/295 |
| 4,147,821 | 4/1979 | Young | 427/295 |
| 4,165,400 | 8/1979 | DeMarco | 427/295 |
| 4,416,921 | 11/1983 | Dunn | 427/353 |
| 4,451,523 | 5/1984 | Nativi et al. | 428/209 |
| 4,479,986 | 10/1984 | Juday | 427/295 |
| 4,632,945 | 12/1986 | Garcia et al. | 523/176 |

FOREIGN PATENT DOCUMENTS

| | | |
|---|---|---|
| 1297103 | 11/1972 | United Kingdom . |
| 1308947 | 3/1973 | United Kingdom . |
| 1547801 | 6/1979 | United Kingdom . |
| 2072231 | 9/1981 | United Kingdom . |
| 2153863 | 8/1985 | United Kingdom . |
| 2198737 | 6/1988 | United Kingdom . |
| 2201156 | 8/1988 | United Kingdom . |

Primary Examiner—Nathan M. Nutter
Assistant Examiner—Jeffrey Culpeper Mullis
Attorney, Agent, or Firm—Quarles & Brady

[57] ABSTRACT

Thermally curable liquid sealants for impregnating the pores of cast metal articles and powdered metal articles including a combination of five polymerizable components within stated percentage ranges essential to providing sealants that, when cured, have low weight loss when tested for heat resistance, low weight gain when tested for chemical resistance upon submersion in water, brake fluid and antifreeze, and superior sealability characteristics.

9 Claims, 3 Drawing Sheets

SEALANT A   SEALANT B   SEALANT C

Fig. 4

SEALANT 1   SEALANT 2   SEALANT 6

Fig. 5

POLYMERIZABLE LIQUID SEALANTS FOR IMPREGNATING CAST METAL AND POWDERED METAL ARTICLES

This is a division of application Ser. No. 07/377,352, filed Jul. 10, 1989 U.S. Pat. No. 5,098,743.

FIELD OF THE INVENTION

This invention relates to new compositions of polymerizable liquid sealants for use in impregnating and sealing pores in cast metal and powdered metal articles.

BACKGROUND ART

Many types of metal articles or components, such as engine blocks, heads, oil and water pumps, brake cylinders, carburetors, transmission cases, etc., are manufactured by casting various metals or alloys, e.g. cast iron, aluminum, brass, magnesium, bronze, etc. Metal articles also are made by powdered metal techniques, in which metal powder is pressed in suitably shaped molds and then sintered at an elevated temperature to consolidate the structure, reduce porosity and impart useful strength; since this is essentially a solid diffusion process, a very high degree of dimensional accuracy is possible and large numbers of parts can be economically produced. A few examples of powdered metal articles are hydraulic pump components, gears, cams, bearings, injector bodies, levers and automotive trim.

With any of the metal casting and powdered metal processes in general use, it is typical for a varying proportion of cast articles and all powdered metal articles to have pores that extend through or partially through a wall of the articles. Because these pores can impair the usefulness of the article, such as by resulting in gaseous or fluid leakage, or preventing normal plating operations, the art of impregnating metal articles to fill the pores has developed in order that the articles can be made useful for their intended purpose.

The most effective technology for impregnation of metal articles is the "dry vacuum-pressure" method in which metal articles are placed in a closed vessel and the vessel is subjected to a vacuum (such as 2 to 10 Torr for 10 to 15 minutes) to cause air entrapped in any pores in the dry articles to escape. Liquid sealant is drawn from a reservoir into the vessel so as to cover and fill the pores of the article. The vacuum is then released and pressure is applied to the liquid sealant level (such as air at 100 psi for 10 to 15 minutes) to drive the sealant further into the pores. Following this, the excess sealant is drained, the parts rinsed, and the sealant is polymerized, i.e. cured, to fill the pores with solid material.

Another impregnation method is a "dry vacuum" process in which metal articles are placed in a closed vessel and the vessel is subjected to a vacuum (e.g. 2 to 10 Torr for 10 to 15 minutes) to cause air entrapped in any pores in the articles to escape. The articles are then submerged in or flooded by liquid sealant, so as to cover the articles and fill the pores and allowed to "soak" for 10 to 15 minutes at atmospheric pressure, following which excess sealant is drained, the articles are rinsed and the sealant is polymerized to fill the pores with solid material. An efficient dry vacuum apparatus is described in my U.S. Pat. No. 4,479,986, issued Oct. 30, 1984, the disclosure of which is incorporated herein for a more detailed description of a dry vacuum impregnation process.

Another commonly practiced technology for impregnation of metal articles is the so-called "wet vacuum" process that includes the steps of submerging the articles in a bath of liquid sealant in an enclosed impregnation tank, and then evacuating the tank to a sufficiently low vacuum (e.g. 2 to 10 Torr for 10 to 15 minutes) to enable most of the air entrapped in pores in the articles to escape so that the pores can be filled with liquid sealant. The vacuum in the impregnating tank is then released and the articles are transferred to a tank in which the excess sealant is allowed to drain off. The articles are transferred to another tank in which they are rinsed with water and/or detergent in order to wash off excess sealant. Next, the articles are transferred to a curing tank to allow the sealant to polymerize or cure to a solid material to fill the pores.

Liquid polymerizable sealants that have been proposed or commercialized to date fall into two broad classes, heat curable sealants that polymerize in the presence of air or oxygen and anaerobic sealants that polymerize in the absence of oxygen. The following lists representative patents disclosing heat curable sealants that polymerize in the presence of oxygen and summarizes their principal ingredient(s).

(1) U.S. Pat. No. 2,772,185
  Unsaturated polyester with cooked-in emulsifier mixed with vinylyl monomer, e.g. 71% polyester and 29% styrene.
(2) U.K. 1,308,947
  Methacrylic or acrylic monomer heated in absence of polymerization catalyst
(3) U.S. Pat. No. 4,147,821
  Monofunctional (meth)acrylic monomer, polyfunctional monomer (typically polyfunctional methacrylate), catalyst and inhibitor
(4) U.S. Pat. No. 4,416,921
  Acrylic monomer, azonitrile, substituted phenol and metal ion chelator Anaerobic liquid sealants for metal articles have been promoted primarily by Loctite Corporation, and the following lists some of their patents relating to anaerobic sealants and summarizes their principal ingredient(s).

(5) U.K. 1,297,103
  Acrylate or methacrylate monomer and redox initator
(6) U.S. Pat. No. 3,672,942
  Monofunctional or polyfunctional acrylate and/or methacrylate monomers and free-radical imitator; washed with solvent solution of polymerization accelerator.
(7) U.S. Pat. No. 3,969,552
  Composition same or similar to U.S. Pat. No. 3,672,942; washed with aqueous nonionic surfactant solution.
(8) U.S. Pat. No. 4,069,378 (now Re. 32,240)
  Composition same or similar to U.S. Pat. No. 3,672,942; sealant contains anionic or nonionic surfactant to be self-emulsifying when mixed with water.
(9) U.S. Pat. No. 4,165,400
  Same sealant composition disclosure as 4,069,378
(10) U.S. Pat. No. 4,632,945
  Monofunctional or polyfunctional acrylate and/or methacrylate monomers, peroxy imitator, organic accelerator such as saccharin, and copper and iron compounds as co-accelerators.

Anaerobic liquid sealants for metal articles are commercially available at the present time, some of which are formulated in accordance with one or more of patents (5)-(10) above. However, as noted in U.S. Pat. No. 4,416,921, patent (4) above, anaerobic sealants present problems since they must be supplied in two parts, one containing a catalytic polymerization accelerator that is to be added to the other part before use. The resulting mixture is liable to undergo premature polymerization, such as by contact with transition metals, and must be constantly aerated in order to prevent this. The tendency towards premature polymerization, the need for aeration, and their two part nature are said in the patent to represent drawbacks to the use of anaerobic liquid sealant compositions.

In view of the above and other disadvantageous characteristics of anaerobic liquid sealants, heat curable or thermosetting compositions are the predominant sealants of choice for almost all cast metal articles and many powdered metal articles as well. Heat curable sealants may be cured with hot water, oil, electric heating elements, hot air, etc., curing is most often practiced by submerging the impregnated articles in hot water in a suitable tank.

As noted in U.S. Pat. No. 2,772,185, (1) above, and U.K. Patent 1,308,947, (2) above, some of the early heat curable sealants consisted of unsaturated polyester mixed with a polymerizable monomer such as styrene, but these compositions presented problems such as high viscosity and the necessity to wash with solvents that inhibited their use; also, the composition proposed by (1) above, is particularly difficult to produce since it proposes a polyester with a cooked in emulsifier and monomer. The U.K. patent, (2) above, proposes a methacrylic or acrylic ester monomer or a mixture of such esters, as a sealant which is cured in the absence of a polymerization catalyst; the cure times described in the patent are quite long, one hour for curing being described in the patent. I do not know of any commercial use of sealants according to either U.S. Pat. No. 2,772,185 or U.K. 1,308,947 at the present time and it is believed that the sealants described in these two patents cannot meet the requirements of current industry practice.

Heat curable sealants said to be formulated according to U.S. Pat. No. 4,147,821 (3) above, have been and are currently sold commercially by the assignee of this patent and others, and sealants said to be according to U.S. Pat. No. 4,416,921 (4) above, are sold commercially by Loctite Corporation. These types of sealants are of interest to end users since they can be cured at relatively low temperatures in relatively short time periods, such as by curing with hot water in a temperature range of about 85° C. to 90° C. for a period of about 4 minutes to 15 minutes. Rapid curing at moderate temperatures facilitates impregnation of metal articles and reduces the time required for processing the articles. However, these sealants, while adequate, do not provide high performance characteristics presently sought by many end users. Among the disadvantages of current commercial heat curable liquid sealants are (i) relatively high heat loss, often expressed as low heat resistance and (ii) relatively poor chemical resistance, particularly to fluids such as brake fluid, antifreeze solutions and deionized water, and (iii) poor sealability. There is, therefore, a need for a heat curable liquid sealant for cast metal and powdered metal articles that provides better heat resistance, better chemical resistance and better overall sealability characteristics than currently-available sealants, and this was the impetus for the development effort that culminated in the present invention.

A principal object of this invention is to develop a heat curable liquid sealant for cast and powdered metal articles that provides improved heat resistance, chemical resistance and sealability as compared to presently-available sealants. Another principal object is to develop sealants with the foregoing advantages while retaining the characteristic of being curable at moderate temperatures and relatively short time periods. Another main object is to provide new heat curable liquid sealants that can be used to impregnate porous cast metal and powdered metal articles with impregnating apparatus and methods now in general use, i.e. that do not require special equipment or unusual processing steps. A further main object is to provide new compositions for liquid sealants that can be readily formulated by simple mixing of ingredients without employing reaction vessels or prolonged processing. Another principal object is to provide liquid sealants that have a viscosity within a range suitable for effective impregnation of metal articles. Yet another is to develop new liquid sealants that exhibit excellent sealability of the pores of metal articles. Still another main object is to accomplish all of the foregoing objectives and yet provide new sealants of moderate cost so as to enable end users to realize enhanced performance benefits without additional expense. These and other objects will become apparent in the detailed description that follows.

SUMMARY OF THE INVENTION

My present invention provides compositions for heat curable liquid sealants for porous cast metal and powdered metal articles consisting essentially of, on a percent by weight basis:

(1) about 25% to 40% of a polymerizable monofunctional methacrylate or acrylate monomer;
(2) about 30% to 40% of a polymerizable polyfunctional dimethacrylate or diacrylate monomer ester of triethylene glycol, tripropylene glycol or tetraethylene glycol;
(3) about 10% to 20% of a polymerizable polyfunctional dimethacrylate or diacrylate ester of diethylene glycol or dipropylene glycol;
(4) about 5% to 15% of a water emulsifiable unsaturated polyester;
(5) about 5% to 15% of a dicyclopentenyloxyethyl methacrylate or acrylate monomer;
(6) 0 to about 3% of a surfactant; and the sealants are further characterized as exhibiting a weight loss of less than about 15% when subjected to a heat resistance test as hereinafter defined and weight gains of less than about 10%, 5% and 5%, respectively, when subjected to chemical resistance tests in water, brake fluid and antifreeze as hereinafter defined.

DESCRIPTION OF PREFERRED EMBODIMENTS

(a) Description of Tests

The following description and the claims refer to certain tests regarding the performance of prior art liquid sealants for metal articles and the performance of the liquid sealants of this invention. The test procedures are defined below.

Heat loss is determined by forming a test body of polymerized sealant in the form of a cylindrical rod about 4.5 mm in diameter and about 25 mm long. A test body is weighed after being fully cured and aged for 24 hours, placed in an oven at 400° F. for 24 hours, and then weighed after removal from the oven. The test body will lose weight after being heated under these conditions, and the weight loss is expressed as a percentage of the original weight of the test body before being subjected to 400° F. temperature for 24 hours. Nine test bodies are tested in this manner, and the weight loss is calculated as an average of that exhibited by the nine test bodies. This test is referred to herein and in the claims as the Heat Resistance Test.

The chemical resistance of a sealant upon exposure to typical fluids is another important characteristic of a sealant. Chemical resistance is determined by forming a test body of polymerized sealant in the form of a cylindrical rod about 4.5 mm in diameter and about 25 mm long; and submerging the body in a test fluid for a period of 96 hours at room temperature. The test body will normally increase in weight by absorbing fluid during this test, although some sealants will partially dissolve in certain fluids so that a test body also may lose weight during this test. The test body is weighed before and after submersion in the test fluid and the weight change is expressed as a percentage (plus or minus) of its weight before submersion. Nine test bodies are submersed in each test fluid and the weight change is calculated as an average of that exhibited by the nine test bodies. The fluids employed for this test as reported in the next two sections of this description are as follows:

(1) Water (deionized water);
(2) Brake fluid, consisting of heavy duty DOT 3 (Gunk ®);
(3) Antifreeze, consisting of a solution of 50% Pretone ® antifreeze (ethylene glycol) and 50% water by weight.

This test is referred to herein and in the claims as the Chemical Resistance Test.

(b) Prior art Sealants

Two commercially-available prior art sealants, one identified by its manufacturer as made under U.S. Pat. No. 4,147,821 (Sealant A below) and the other identified by its manufacturer as made under U.S. Pat. No. 4,416,921 (Sealant B below), were subjected to the Heat Resistance Test and the Chemical Resistance Test as described in part (a) with the results set forth below. Sealant A is believed to comprise 52% hydroxy propyl methacrylate, 13.5% lauryl methacrylate, 28% triethylene glycol dimethacrylate and 6.7% surfactant; Sealant B is believed to comprise essentially 99% polyethylene glycol dimethacrylate, with very small quantities such as 1 to 200 ppm each of a substituted phenol and a metal ion chelator.

| Sealant A (U.S. Pat. No. 4,147,821) | |
|---|---|
| Heat Resistance Test | 24.7% weight loss |
| Chemical Resistance Test | |
| (a) Water | 18.56% weight loss |
| (b) Brake fluid | 45.45% weight gain |
| (c) Antifreeze | 9.58% weight gain |
| Sealant B (U.S. Pat. No. 4,416,921) | |
| Heat Resistance Test | 29.51% weight loss |
| Chemical Resistance Test | |
| (a) Water | 6.74% weight gain |
| (b) Brake fluid | 11.25% weight gain |
| (c) Antifreeze | 10.52% weight gain |

The above commercial sealants have been and are being used to impregnate various types of metal articles However, their heat resistance and chemical resistance as shown by the above data are sufficiently inadequate to preclude or inhibit their use for impregnating many types of metal articles that are subjected to rigorous heat conditions or particular fluids in applications that require better performance. The assignee of this patent has for the past several years been selling a high performance liquid sealant for metal articles that exhibits vastly superior heat and chemical resistance. This sealant, identified below as Sealant C, is of a composition analyzed as including 28% hydroxy propyl methacrylate, 28% triethylene glycol dimethacrylate, 15% unsaturated polyester and 28% dicyclopentenyloxyethyl methacrylate. Heat and chemical resistance characteristics of Sealant C are as follows:

| Sealant C | |
|---|---|
| Heat Resistance Test | 7.02% weight loss |
| Chemical Resistance Test | |
| (a) Water | 4.86% weight gain |
| (b) Brake fluid | 5.29% weight gain |
| (c) Antifreeze | N.C.* |

*N.C. as reported above and in the following section (c) means there was no change in weight.

Sealant C has excellent performance characteristics and is one of the few commercial sealants useful for applications in which high levels of heat and chemical resistance are required or specified. However, Sealant C has certain properties that can present undesirable processing features. For example, the sealant has a high viscosity that makes it difficult to wash from metal articles after impregnation and before curing, which results in flocculation in the cure tank of excess sealant when cured with hot water that contaminates the cure tank; the high viscosity further results in the use of more sealant than necessary since more of it is left on the surface of the article and must be washed from the articles. Also, and of importance to end users, is the fact the sealant is a high cost sealant, averaging about 30–40% more in price than Sealants A and B.

(c) Sealants of the Invention

The heat curable sealants of this invention are based upon a combination of selected polymerizable components, each combined within stated percentage ranges so as to yield high levels of heat resistance, chemical resistance and sealability, and yet provide these advantageous performance features without disadvantageous processing requirements and at a moderate cost to the end user.

In addition to the formulations described in detail below, the new sealants of the invention are further characterized as exhibiting the following performance characteristics:

(1) Heat resistance of less than about 15% weight loss, determined according to the Heat Resistance Test;
(2) Chemical resistance to water of less than about 10% weight gain, determined according to the Chemical Resistance Test;
(3) Chemical resistance to brake fluid of less than about 5% weight gain, determined according to the Chemical Resistance Test; and
(4) Chemical resistance to antifreeze of less than about 5% weight gain, determined according to the Chemical Resistance Test.

The new sealants provide these performance characteristics and also exhibit excellent processability in that they are readily washed or rinsed from metal articles after impregnation and prior to curing, do not flocculate in a curing tank, and in other respects so that they may be used to impregnate cast and powdered metal articles with the usual types of equipment in general use for impregnation Last, but of primary significance to the end user of the metal articles, the new sealants provide excellent sealing of pores in cast metal articles and powdered metal articles.

The present heat curable liquid sealants include a major proportion of polymerizable monofunctional and polyfunctional methacrylate or acrylate esters. (All of the percentages expressed in this description and in the claims are on a percent by weight basis.) These types of compounds have been demonstrated over a long period of years to be useful as components of liquid sealants, and one or more are included in the prior art sealants described in part (b) above. However, I have found that sealants must include a blend of several different methacrylate or acrylate monomers and each must be present in a specified amount in order to provide sealants capable of meeting the objectives of the invention, as follows.

Component (1): about 25% to 40% of a polymerizable monofunctional methacrylate or acrylate monomer;
Component (2): about 30% to 40% of a polymerizable polyfunctional monomer consisting of a dimethacrylate or diacrylate ester of triethylene glycol, tripropylene glycol or tetraethylene glycol;
Component (3): about 10% to 20% of a polymerizable polyfunctional monomer consisting of a dimethacrylate or diacrylate ester of diethylene glycol or dipropylene glycol.

With respect to the monofunctional methacrylate/acrylate monomer, component (1), it has been found that including more than about 40% thereof in a sealant results in rapid and significant deterioration of heat resistance; conversely, incorporating less than about 25% thereof in a sealant results in a high polymerization exothermic reaction which then causes extreme cracking and crazing of the cured sealant. About 30% to 35% of component (1) is an especially useful range for this compound of the formulations. The dimethacrylate/diacrylate ester of triethylene, tripropylene or tetraethylene glycol, component (2), must be included in the sealant in order to achieve crosslinking when the sealant cures to thereby provide good heat and chemical resistance characteristics. Including a dimethacrylate/diacrylate ester of diethylene glycol or dipropylene glycol monomer, component (3), as part of the polymerizable component of the sealant provides for a definite enhancement of heat and chemical resistance as compared to the use of only the component (2) monomer by itself. Within the effective range of about 10% to 20% of component (3), about 10% to 15% thereof has been found especially useful. Thus, all three methacrylate/acrylate esters described above must be present in a sealant within the stated ranges in order to meet the objectives previously established.

Utilizing the above methacrylate/acrylate monomers without further polymerizable components yields a sealant that is capable of curing within pores in metal articles, but the present work has further found that the components (1)–(3) do not provide a sealant that is capable of achieving the high level of sealability nor heat or chemical resistance sought as objectives of this invention. It was further found that an additional polymerizable compound must be combined therewith in order to meet the present objectives, as follows.

Component (4): about 5% to 15% of a water emulsifiable unsaturated polyester.

The stated percentage range for the polyester component (4) is essential for providing the desired level of sealability; less than about 5% polyester results in a rapid decrease in sealability, and more than about 15% yields no increase in sealability but results in a dramatic increase in viscosity that causes drag-out and washing or rinsing problems. About 8% to 13% of the polyester is particularly useful for most sealants.

Still further, however, the above polymerizable components (1)–(4) are not effective by themselves to provide a liquid sealant for metal articles that exhibits the high level of heat resistance sought as an objective of this invention, and a fifth polymerizable component must be added for this purpose, as follows.

Component (5): about 5% to 15% of polymerizable dicyclopentenyloxyethyl methacrylate or dicyclopentenyloxyethyl acrylate monomer.

It has been found that adding at least about 5% of polymerizable component (5) results in substantial improvement of heat resistance, i.e. reducing the heat loss of the cured sealant when determined according to the Heat Resistance Test. Including more than about 15% of polymerizable component (5) results in no significant improvement in heat resistance but adds substantially to the cost of the sealant.

To summarize the foregoing, the new liquid sealants of the invention include the following polymerizable components:

(1) monofunctional methacrylate or acrylate monomer, about 25 to 40%, preferably about 30% to 35%;
(2) polyfunctional dimethacrylate or diacrylate monomer ester of triethylene glycol, tripropylene glycol or tetraethylene glycol, about 30 to 40%;
(3) polyfunctional dimethacrylate or diacrylate ester of diethylene glycol or dipropylene glycol, about 10% to 20%, preferably about 10% to 15%;
(4) water emulsifiable unsaturated polyester, about 5 to 15%, preferably about 8% to 13%; and
(5) dicyclopentenyloxyethyl methacrylate or dicyclopentenyloxyethyl acrylate monomer, about 5 to 15%.

Polymerizable monofunctional methacrylate and acrylate monomers suitable for component (1) of the above sealant compositions are monomers of the type formula in which $R_1$ is H or $CH_3$, and $R_2$ is $C_nH_{2n+1}$ or $C_nH_{2n}OH$ in which n is an integer of 1 to about 20, preferably 2 to 12. Exemplary monomers of the above type formula are methyl methacrylate, ethyl methacrylate, propyl methacrylate, isobutyl methacrylate, methyl acrylate, butyl acrylate, hydroxypropyl methacrylate, hydroxypropyl acrylate and lauryl methacrylate. Compounds of this type are available commercially from a number of chemical companies.

Polyfunctional monomers suitable for component (2) of the above compositions are the dimethacrylate and diacrylate esters formed by the reaction of methacrylic acid or acrylic acid, or their anhydrides, and triethylene glycol, tripropylene glycol or tetraethylene glycol. Exemplary monomers of this type include triethylene glycol dimethacrylate tetraethylene glycol dimethacrylate, and tetraethylene glycol diacrylate. Compounds of this type are commercially available from a number of chemical companies.

Polyfunctional monomers suitable for component (3) of the above sealant compositions are the dimethacrylate and diacrylate esters formed by the reaction of methacrylic acid or acrylic acid, or their anhydrides, and ethylene glycol, 1,2- or 1,3-propylene glycol, neopentyl glycol, and 1,3- or 1,4-butylene glycol. Exemplary monomers include ethylene glycol dimethacrylate, butanediol dimethacrylate, and neopentylglycol diacrylate. Compounds of this type are available commercially from a number of chemical companies.

The unsaturated polyester component (4) of the above sealant compositions is to consist of a water emulsifiable unsaturated polyester resin reactive with the acrylate monomers of components (1)–(3) to form a cross-linked solid upon curing or polymerization of the liquid sealant. A suitable polyester is available commercially from Freeman Chemical Corporation under their tradename Stypol ® XL072-A798-32; the specific composition of the polyester is not published by Freeman Chemical, but analysis has shown that it is a polyester formed by the reaction of adipic acid (44%) and fumaric acid (15.4%) with a mixture of polyols including diethylene glycol (28.7%), pentaerythritol (9.6%) and ethylene glycol (2.3%). Other suitable unsaturated polyesters are considered to be available from other resin manufacturers.

Component (5) of the above sealant compositions is dicyclopentenyloxyethyl methacrylate or acrylate which is of the type formula in which $R_1$ is H or $CH_3$. Compounds of this type are available commercially from Rohm and Haas under their tradenames Rocryl ® 57,672 and 657T and consist of high molecular weight liquids (MW=262, 248 and 262 respectively) with a specific gravity of 1.064, 1.085 and 1.064 respectively.

In addition to polymerizable components (1)–(5), the sealants can and generally should include (6) an inhibitor, when formulated for shipment to an end user. The inhibitor (6) is included to prevent premature polymerization of the sealant and provide a stable sealant with acceptable shelf life. Suitable inhibitors include quinones, hydroquinones or phenols and substituted phenols. A small amount of inhibitor, such as about 0.01% to 2%, is sufficient; about 0.1% to 0.4% of inhibitor gives satisfactory results.

A catalyst is mixed with the liquid sealants by the end user at the time a sealant is added to the impregnation tank or reservoir tank of impregnation apparatus. The sealant manufacturer will generally supply the user with a pre-measured quantity of catalyst appropriate for each drum or other quantity of sealant. Many catalysts are suitable, such as benzoyl peroxide, methyl ethyl ketone peroxide, alkyl peresters, cumeme hydroperoxide, or an azonitrile such as, for example, 2, 1'-azo bis (isobutyronitrile) identified herein as AZBN. The sealants need contain only a small amount of the selected catalyst, such as on the order of about 0.03% to 1%. Sealants of the invention have excellent pot life after a catalyst is added; for example, gel times of 83+ days at 70° F. and 42+ days at 80° F., 115° F. and 130° F. have been measured under laboratory conditions, and these times can be further extended by cooling the sealants to 65° F. and employing periodic agitation and/or aeration. The sealants can be cured with hot water at a temperature of about 190° F. to 200° F. in about 4 minutes to 15 minutes after being catalyzed, with preferred conditions being 10 minutes curing time with water at 195° F.

The present sealants also may include a surfactant as an optional ingredient to assist in the washability or rinsability of excess uncured sealant from a metal article prior to curing. However, a sealant of the invention should contain no more than about 4% surfactant as it has been discovered that eliminating or reducing surfactant in sealants having the above combination of polymerizable components dramatically enhances the heat and chemical resistance of the cured sealant. Therefore, the new sealants may include from 0% to about 4% of surfactant, with 0% being preferred for optimum performance. Many types of anionic and nonionic surfactants, or mixtures thereof can be added to the sealants of the invention, and routine checking may be required to select a specific surfactant that does not adversely affect the desired performance factors, that is compatible with the sealant composition and that does not impair the stability of the sealant. Examples of suitable anionic surfactants include sodium alkyl and akylkylaryl sulfates, petroleum sulfonates and sulfonated ethoxylated surfactants; examples of suitable nonionic surfactants include ethoxylated alcohols, linear or branched ethoxylated alkyl phenols and polyoxyethylene and polyoxypropylene glycols and esters. Appropriate surfactants are available commercially from a number of companies under various tradenames such as, for example, E. I. du Pont de Nemours & Co. (Alkanol ® and Duponol ®), Union Carbide Corp. (Tergitol ®), Shell Chemical Co. (Neodol ®), GAF Corp. (Alipal ® and Igepal ®), Rohm & Haas Co. (Triton ®) and ICI (Tween ®).

Another optional element is a dye, preferably a fluorescent dye, to provide for visual inspection of cured sealant. The sealants may include from 0 to about 1% of dye, although only a small amount is needed, such as about 0.01 to 0.05%.

The following Examples 1-6 present several exemplary sealants formulated in accordance with the present invention.

EXAMPLE 1

Sealant 1 of the formulation set forth below was prepared by admixing the several ingredients with light stirring.

| Sealant 1 | |
|---|---|
| Component (1) | 33.68% |
| hydroxypropyl methacrylate | |
| Component (2) | 38.1% |
| triethylene glycol dimethacrylate | |
| Component (3) | 11.6% |
| diethylene glycol dimethacrylate | |
| Component (4) | 8.2% |
| water emulsifiable unsaturated polyester[a] | |
| Component (5) | 4.8% |
| dicyclopentenyloxyethyl methacrylate[b] | |
| Catalyst | 0.4% |
| azobisisobutyronitrile[c] | |
| Inhibitor | 0.2% |
| butylated hydroxy toluene[d] | |
| Surfactant | 3.0% |
| polyoxyethylene sorbitan monooleate[e] | |
| Dye | 0.02% |
| fluorescent, benzoxazol derivative[f] | 100% |

In Example 1, and the following Examples 2-6, the tradenames and suppliers for certain compounds listed in the formulations are as follows.
(a) Stypol® XL072-A798-32, Freeman Chemical;
(b) Rocryl® QM57T, Rohm & Haas;
(c) Vazo® 64, du Pont;
(d) Ralox® BHT, Raschig Corp;
(e) Tween® 80, ICI; and
(f) Hostalux® KCB, Hoechst Celanese.

Cured test bodies of Sealant 1 were subjected to the Heat Resistance Test and Chemical Resistance Test procedures described in section (a) with the following results.

| Heat Resistance Test | 10.5% weight loss |
|---|---|
| Chemical Resistance Test | |
| (a) Water | 7.85% weight gain |
| (b) Brake fluid | 0.53% weight gain |
| (c) Antifreeze | 3.88% weight gain |

EXAMPLE 2

Sealant 2 of the formulation set forth below was prepared by admixing the several ingredients with light stirring.

| Sealant 2 | |
|---|---|
| Component (1) | 29.38% |
| hydroxypropyl methacrylate | |
| Component (2) | 32.2% |
| triethylene glycol dimethacrylate | |
| Component (3) | 10.0% |
| diethylene glycol dimethacrylate | |
| Component (4) | 12.8% |
| water emulsifiable unsaturated polyester[a] | |
| Component (5) | 15.0% |
| dicyclopentenyloxyethyl methacrylate[b] | |
| Catalyst | 0.4% |
| azobisisobutyronitrile[c] | |
| Inhibitor | 0.2% |
| butylated hydroxy toluene[d] | |
| Surfactant | 0.0% |
| Dye | 0.02% |
| fluorescent, benzoxazol derivative[f] | 100% |

Cured test bodies of Sealant 2 were subjected to the Heat Resistance Test and Chemical Resistance Test procedures described in section (a) with the following results.

| Heat Resistance Test | 10.5% weight loss |
|---|---|
| Chemical Resistance Test | |
| (a) Water | 4.0% weight gain |
| (b) Brake fluid | 0.6% weight gain |
| (c) Antifreeze | 1.7% weight gain |

EXAMPLE 3

Sealant 3 of the formulation set forth below was prepared by admixing the several ingredients with light stirring.

| Sealant 3 | |
|---|---|
| Component (1) | 35.88% |
| hydroxypropyl methacrylate | |
| Component (2) | 30.0% |
| triethylene glycol dimethacrylate | |
| Component (3) | 10.0% |
| diethylene glycol dimethacrylate | |
| Component (4) | 8.5% |
| water emulsifiable unsaturated polyester[a] | |
| Component (5) | 15.0% |
| dicyclopentenyloxyethyl methacrylate[b] | |
| Catalyst | 0.4% |
| azobisisobutyronitrile[c] | |
| Inhibitor | 0.2% |
| butylated hydroxy toluene[d] | |
| Surfactant | 0.0% |
| Dye | 0.02% |
| fluorescent, benzoxazol derivative[f] | 100% |

Cured test bodies of Sealant 3 were subjected to the Heat Resistance Test and Chemical Resistance Test procedures described in section (a) with the following results.

| Heat Resistance Test | 12.8% weight loss |
|---|---|
| Chemical Resistance Test | |
| (a) Water | 5.6% weight gain |
| (b) Brake fluid | 0.6% weight gain |
| (c) Antifreeze | 3.1% weight gain |

EXAMPLE 4

Sealant 4 of the formulation set forth below was prepared by admixing the several ingredients with light stirring.

| Sealant 4 | |
|---|---|
| Component (1) | 34.38% |
| hydroxypropyl methacrylate | |
| Component (2) | 39.5% |
| triethylene glycol dimethacrylate | |
| Component (3) | 12.0% |
| diethylene glycol dimethacrylate | |
| Component (4) | 8.5% |
| water emulsifiable unsaturated polyester[a] | |
| Component (5) | 5.0% |

13

-continued

| Sealant 4 | |
|---|---|
| dicyclopentenyloxyethyl methacrylate[b] | |
| Catalyst | 0.4% |
| azobisisobutyronitrile[c] | |
| Inhibitor | 0.2% |
| butylated hydroxy toluene[d] | |
| Surfactant | 0.0% |
| Dye | 0.02% |
| fluorescent, benzoxazol derivative[f] | 100% |

Cured test bodies of Sealant 4 were subjected to the Heat Resistance Test and Chemical Resistance Test procedures described in section (a) with the following results.

| Heat Resistance Test | 14.1% weight loss |
|---|---|
| Chemical Resistance Test | |
| (a) Water | 7.1% weight gain |
| (b) Brake fluid | 0.6% weight gain |
| (c) Antifreeze | 2.93% weight gain |

EXAMPLE 5

Sealant 5 of the formulation set forth below was prepared by admixing the several ingredients with light stirring.

| Sealant 5 | |
|---|---|
| Component (1) | 34.38% |
| hydroxypropyl methacrylate | |
| Component (2) | 36.2% |
| triethylene glycol dimethacrylate | |
| Component (3) | 11.0% |
| diethylene glycol dimethacrylate | |
| Component (4) | 12.8% |
| water emulsifiable unsaturated poylester[a] | |
| Component (5) | 5.0% |
| dicyclopentenyloxyethyl methacrylate[b] | |
| Catalyst | 0.4% |
| azobisisobutyronitrile[c] | |
| Inhibitor | 0.2% |
| butylated hydroxy toluene[d] | |
| Surfactant | 0.0% |
| Dye | 0.02% |
| fluorescent, benzoxazol derivative[f] | 100% |

Cured test bodies of Sealant 5 were subjected to the Heat Resistance Test and Chemical Resistance Test procedures described in section (a) with the following results.

| Heat Resistance Test | 13.6% weight loss |
|---|---|
| Chemical Resistance Test | |
| (a) Water | 7.9% weight gain |
| (b) Brake fluid | 0.3% weight gain |
| (c) Antifreeze | 3.9% weight gain |

EXAMPLE 6

Sealant 6 of the formulation set forth below was prepared by admixing the several ingredients with light stirring.

| Sealant 6 | |
|---|---|
| Component (1) | 25.0% |
| hydroxypropyl methacrylate | |
| Component (2) | 34.5% |

14

-continued

| Sealant 6 | |
|---|---|
| triethylene glycol dimethacrylate | |
| Component (3) | 17.0% |
| diethylene glycol dimethacrylate | |
| Component (4) | 8.5% |
| water emulsifiable unsaturated polyester[a] | |
| Component (5) | 12.0% |
| dicyclopentenyloxyethyl methacrylate[b] | |
| Catalyst | 0.4% |
| azobisisobutyronitrile[c] | |
| Inhibitor | 0.2% |
| butylated hydroxy toluene[d] | |
| Surfactant | 2.4% |
| polyoxyethylene sorbitan monooleaste[e] | |
| Dye | 0.0% |
| fluorescent, benzoxazol derivative[f] | 100% |

Cured test bodies of Sealant 6 were subjected to the Heat Resistance Test and Chemical Resistance Test procedures described in section (a) with the following results.

| Heat Resistance Test | 10.21% weight loss |
|---|---|
| Chemical Resistance Test | |
| (a) Water | 5.99% weight gain |
| (b) Brake fluid | 0.56% weight gain |
| (c) Antifreeze | 1.69% weight gain |

The heat and chemical resistance data reported above for Examples 1–6 demonstrate that the new sealants of the present invention meet high performance characteristics in that they exhibit low heat loss when subjected to the Heat Resistance Test and low weight gain when tested with respect to water, brake fluid and antifreeze determined according to the Chemical Resistance Test. Specific formulations of Sealants 1–6 of these examples meet the performance objectives as to each of these tests that are characteristic of the sealants of the present invention, to wit:

(1) Weight loss of less than about 15% when subjected to the Heat Resistance Test;
(2) A weight gain of less than about 10% in water as determined according to the Chemical Resistance Test;
(3) A weight gain of less than about 5% in brake fluid as determined according to the Chemical Resistance Test; and
(4) A weight gain of less than about 5% in antifreeze as determined according to the Chemical Resistance Test.

Another characteristic of the sealants of the invention is that they have a viscosity in the range of about 29 to 33 seconds as measured with a No. 1 Zahn cup at 72° F. This is a highly useful viscosity range for sealants for metal articles, in that a sealant with a viscosity over 33 seconds cannot be washed readily from the metal articles, which results in using an excessive amount of resin; conversely, sealants that have a viscosity under about 29 seconds exhibit poor sealability. With respect to the specific formulations set forth in Examples 1–6, the viscosity of each sealant is as follows:

Sealant 1...30 seconds;
Sealant 2...32 seconds;
Sealant 3...31 seconds;
Sealant 4...31 seconds;
Sealant 5...32 seconds; and
Sealant 6...30.5 seconds The unique formulations of sealants of the present invention comprising a blend of five different polymerizable components, each within a stated percentage range, results in sealants for metal articles that exhibit new and useful performance standards. The significant performance characteristics of the new sealants are further demonstrated by Table 1 that presents a Weight Change Index which represents the total weight change of Sealants 1-6 of the present invention as compared to the total weight change of prior art Sealants A-C when subjected to the same Heat Resistance and Chemical Resistance Tests.

(d) Sealability Tests

As demonstrated by the data concerning heat and chemical resistance presented in section (c), the new sealants of the present invention have demonstrably superior properties in these respects as compared to prior art Sealants A and B, and nearly match those of Sealant C. The superior nature of Sealants 1-6 in connection with these properties indicate the sealants have attractive characteristics for impregnating many different types of porous metal articles, but the new sealants also must be capable of effectively sealing the pores in

TABLE 1

| | WEIGHT CHANGE INDEX | | | | |
|---|---|---|---|---|---|
| Sealant | Heat Resistance | Water Resistance | Brake Fluid Resistance | Antifreeze Resistance | WEIGHT CHANGE INDEX |
| NEW SEALANTS | | | | | |
| Sealant 1 | −10.5% | +7.85% | +0.53% | +3.88% | 22.76 |
| Sealant 2 | −10.5% | +4% | +0.6% | +1.7% | 16.8 |
| Sealant 3 | −12.8% | +5.6% | +0.6% | +3.1% | 22.1 |
| Sealant 4 | −14.1% | +7.1% | +0.6% | +2.93% | 24.73 |
| Sealant 5 | −13.6% | +7.9% | +0.3% | +3.9% | 25.7 |
| Sealant 6 | −10.21% | +5.99% | +0.56% | +1.69% | 18.45 |
| PRIOR ART SEALANTS | | | | | |
| Sealant A | −24.7% | +18.56% | +45.45% | +9.58% | 98.29 |
| Sealant B | −29.51% | +6.74% | +11.25% | +10.52% | 58.02 |
| Sealant C | −7.02% | +4.86% | +5.29% | N.C. | 17.17 |

Figure 5:
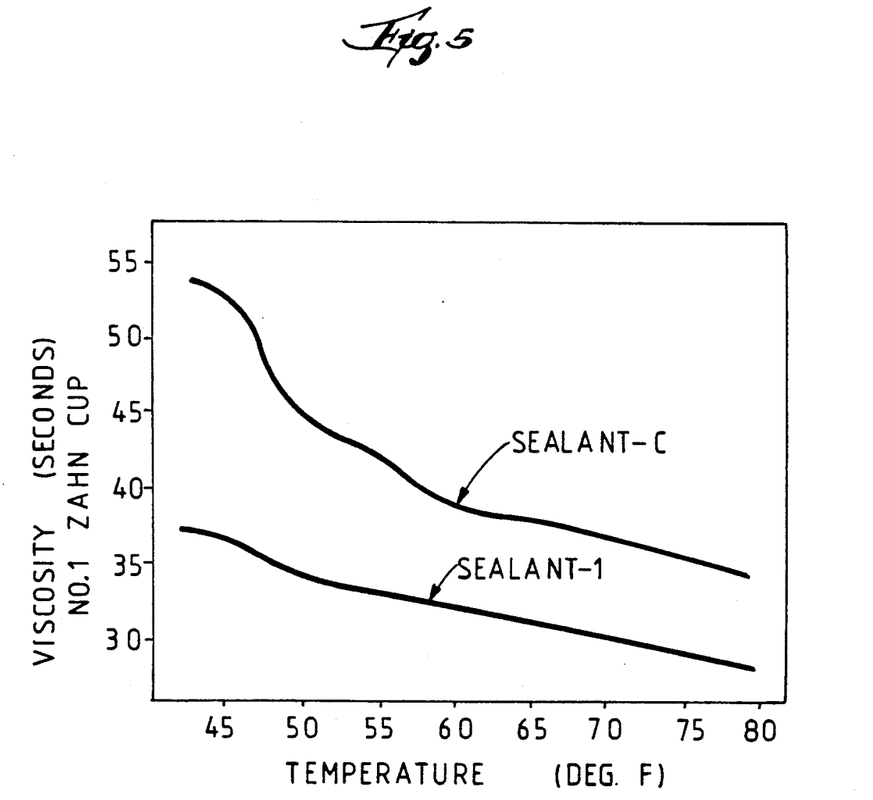
FIG. 5 is a graph comparing the viscosity of Sealant 1 of the invention to the viscosity of prior art Sealant C.

As shown in Table 1, Sealants 1-6 according to the invention all have a very low Weight Change Index, in the range of 16.8 to 25.7. These low values of the Weight Change Index demonstrate that sealants of the invention have a high degree of heat resistance and a high degree of chemical resistance to water, brake fluid and antifreeze. The superior performance of the present sealants is further demonstrated by comparison to the Weight Change Index for prior art Sealants A and B, which are commercial sealants intended for similar end uses as the sealants of this invention. Sealant A has a Weight Change Index of 98.29 and Sealant B a Weight Change Index of 58.02, thereby substantiating inferior heat and chemical resistance as compared to the sealants of the invention. Prior art Sealant C has a Weight Change Index of 17.17, which is in the same range as the Index for the present sealants. However, as shown previously in part (b), Sealant C exhibits adverse processability characteristics, including difficulty of washing from metal articles and subsequent flocculation in the cure tank. In addition, the sealant has a relatively high viscosity (36.5 seconds at 72° F. measured with a No. 1 Zahn cup) so that it does not penetrate pores of the metal articles as easily as the sealants of the invention which thereby results in an excess of Sealant C left on the surface of the articles that must be washed away and is thereby wasted. FIG. 5 illustrates the viscosity curve of prior art Sealant C and the viscosity curve of Sealant 1 of the invention over a temperature range of 45°-80° F., from which it can be seen that prior art Sealant C has a substantially higher viscosity than Sealant 1 throughout the illustrated temperature range. Impregnation of metal articles is usually carried out at a temperature of about 60°-75° F. in most plants. The viscosity curve of Sealant 1 is typical of the viscosity characteristics of the sealants of the present invention. Furthermore, Sealant C is a high cost sealant, whereas the present sealants are of moderate cost at the same price level as prior art Sealants A and B.

metal articles in order to be useful for their intended purpose. The information described in this section (d) demonstrates the efficacy of Sealants 1-6 with respect to sealability.

The sealability testing reported herein was conducted in accordance with the procedure of MIL-I-17563B, which sets forth a detailed procedure for testing the sealability of sealants for metal articles. The test specimens as required by this procedure consisted of powdered brass metal sintered or fused together to form porous metal cylindrical articles one inch long with a one inch outside diameter and a 0.75 inch inside diameter, i.e. a one inch diameter cylinder with a 0.75 inch longitudinal bore along its central axis. The test specimens had a void volume of at least 18%, also determined according to MIL-I-17563B.

All of the impregnated test specimens described in this section (d) were impregnated according to the following procedure. (1) The specimens were subjected to a dry vacuum cycle for 20 minutes at 1.5 to 2 Torr vacuum to allow escape of air entrapped in the pores or voids of the specimens. (2) The test specimens were then submerged in the respective sealants for 20 minutes at 1.5 to 2 Torr vacuum. (3) While still submersed in the sealants, the specimens were subjected to a pressure cycle for 20 minutes at 100 psi (6.8 atmospheres). (4) Following step 3, the impregnated specimens were drained for 15 minutes to allow excess sealant to drain from the surface of the specimens. (5) Next, the specimens were subjected to a light rinse cycle during which they were washed with water at room temperature for 15 seconds. (6) Last, the impregnated specimens were subjected to a water cure cycle in which the specimens were submersed in water heated to 195° F. for a period of 10 minutes to polymerize the various sealants. The specimens were subjected thereafter to the pressure testing for detection of leakage as described in the next paragraph.

Figure 1:
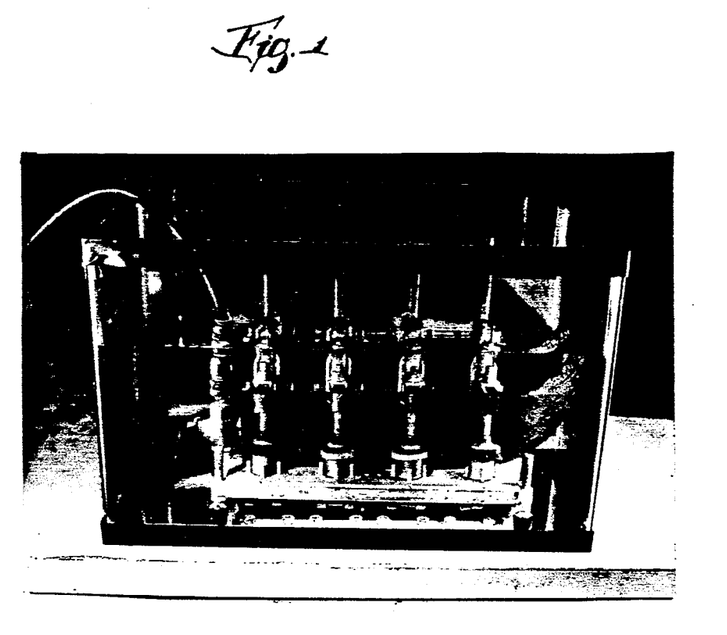
FIG. 1 illustrates apparatus for testing the sealability of sealants as described in section (d) of this specification.

FIG. 1 illustrates the apparatus for pressure testing of unimpregnated and impregnated test specimens. A manifold is at the bottom of a tank partially filled with water. Gas under pressure, nitrogen gas in this instance, is fed through a hose and valve to the left end of the manifold. The hollow cylindrical brass powdered metal test specimens are placed on the manifold with their bottom end seated on an O-ring seal carried within a circular groove in the manifold and the specimens are retained in the desired position by short vertical pins. As shown in FIG. 1, four test specimens are accommodated on the manifold in this manner. A rubber gasket is seated on the top end of a specimen, and the metal plate of a vertical clamp engages the top of the gasket. The clamp is tightened to hold each specimen firmly in place and provide a gas-tight seal at the top and bottom ends of the specimen. Nitrogen gas at a pressure of 50 psi, is fed into the longitudinal internal bore of a test specimen and leakage is determined by observing the extent to which gas escapes through the wall of a specimen; the specimens are submerged in water during this procedure so that the bubbles of gas escaping through the wall will be visible. Also, as shown in FIG. 1, black material is positioned in the tank behind the specimens to enhance visibility of bubbles of gas.

Figure 2:
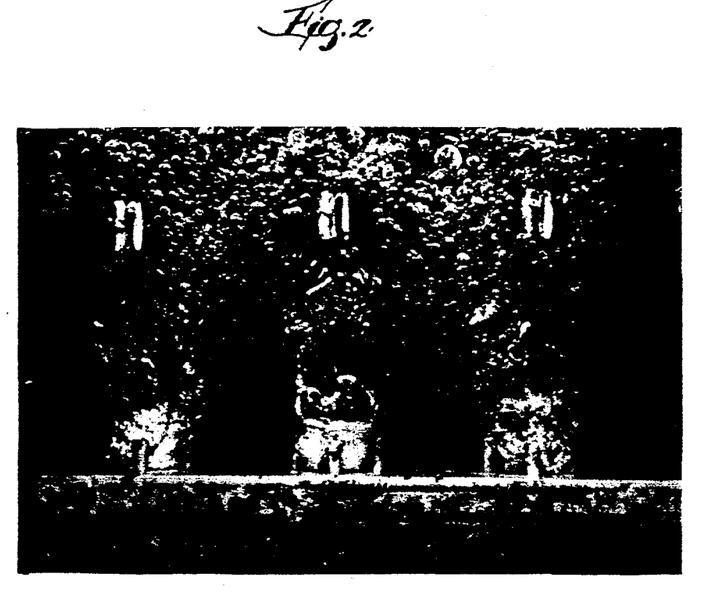
FIG. 2 illustrates unimpregnated test specimens consisting of powdered metal hollow cylindrical articles undergoing testing for leakage.

FIG. 2 illustrates the leakage exhibited by the test specimens before being impregnated with any type of sealant. Three test specimens are shown in FIG. 2, and it can be seen that copious quantities of nitrogen are leaking through each specimen, thereby demonstrating the high porosity of the test specimens.

Figure 3:
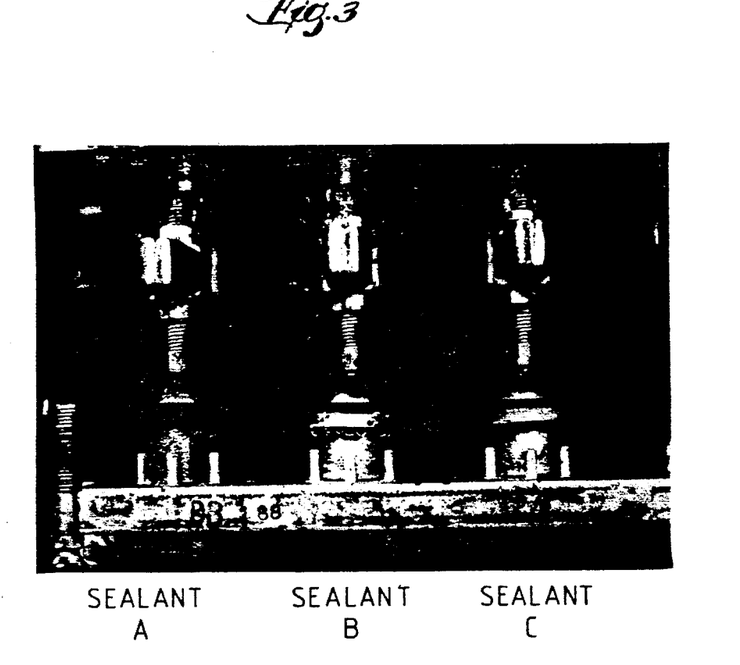
FIG. 3 illustrates test specimens of the type shown in FIG. 2 undergoing testing for leakage after being impregnated with prior art Sealants A, B and C.

FIG. 3 illustrates the test specimens after impregnation with prior art Sealants A, B and C with nitrogen at 50 psi being fed into the internal bore of each specimen. The specimen impregnated with Sealant A is at the left in FIG. 3 and it will be noted that substantial quantities of nitrogen are leaking through the test specimen. Gas bubbles are visible flowing above the specimen and collecting on the water level at the top of the drawing. Also, a substantial number of bubbles of nitrogen have collected along the exterior surface of the specimen and along the underside of the gasket at the top of the specimen. The specimen impregnated with prior art Sealant B is in the middle of FIG. 3. Again, a substantial stream of bubbles of nitrogen can be seen leaking through the specimen and flowing up to the water level of the apparatus, and a substantial number of bubbles have collected along the exterior surface of the specimen and under the gasket holding the specimen on the manifold. It is clear from FIG. 3 that prior art Sealant A and Sealant B were unable to completely seal the pores in the test specimens; it may be noted that both Sealants A and B fail to meet the requirements of MIL-I-17563B. A test specimen impregnated with prior art Sealant C is shown on the right in FIG. 3. Unlike the case with sealants A and B, it can be seen that Sealant C almost completely seals the pores in the test specimen. Sealant C is one of the few sealants to meet the requirements of MIL-I-17563B. It will be shown that sealants of the invention also pass the requirements of this MIL test and yet exhibit none of the disadvantages of sealant C, as previously described in section (c) above.

Figure 4:
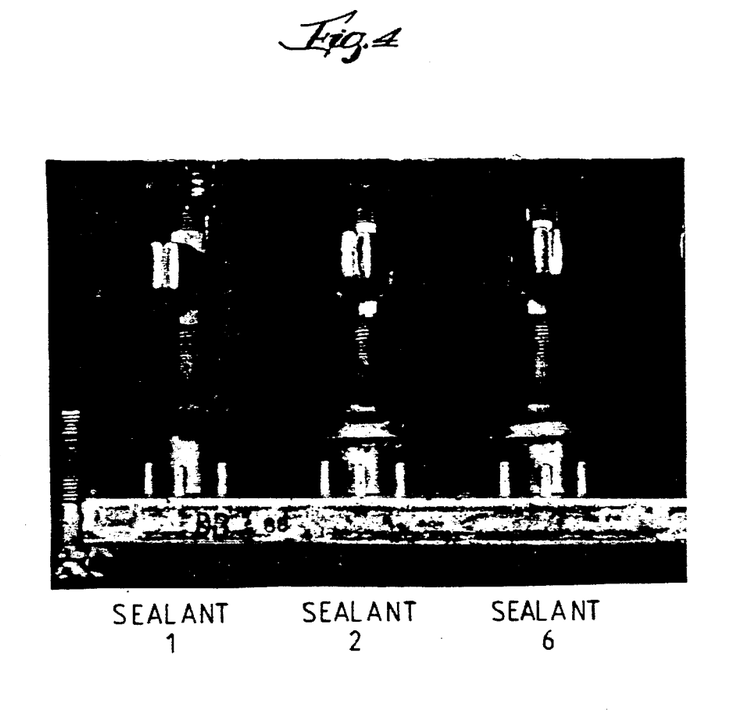
FIG. 4 illustrates test specimens of the type shown in FIG. 2 undergoing testing for leakage after being impregnated with Sealants 1, 2 and 6 according to this invention.

FIG. 4 illustrates test specimens impregnated with Sealants 1, 2 and 6 of the present invention with nitrogen at 50 psi being fed through the internal bore of each specimen. The test specimen impregnated with Sealant 1 is shown at the left in FIG. 4, the specimen impregnated with Sealant 2 is in the middle in FIG. 4 and the specimen impregnated with Sealant 6 is at the right in FIG. 4. Bearing in mind that the specimens of FIG. 4 are being supplied with nitrogen gas at 50 psi as was the case with those of FIG. 3, it will be noted that there are no visible streams of bubbles of nitrogen escaping through the walls of the specimens impregnated with either Sealant 1, Sealant 2 or Sealant 6. A very few fine bubbles of gas can be detected along the outer surface of the specimen impregnated with Sealant 1. Somewhat larger bubbles of gas are visible along the exterior surface of the specimen impregnated with Sealant 2 and a few bubbles have collected under the gasket at the top end of the specimen. A very few fine bubbles of gas may be detected on the outer surface of the specimen impregnated with Sealant 6, and a few bubbles have collected under the gasket at the top of the specimen.

Comparison of FIG. 4 to FIG. 3 demonstrates that sealants of the invention exhibit vastly improved sealability as compared to prior art Sealant A and Sealant B. This improvement in sealability is clearly visible by the substantial reduction in the flow of gas bubbles through the test specimens impregnated with Sealants 1, 2 and 6 as compared to the same test specimens impregnated with Sealants A and B. The improved sealability of the sealants of the invention is further evidenced by the fact that the new sealants have met the requirements of MIL-I-17563B and have been granted the appropriate approval as qualified products. As noted previously, prior art Sealants A and B do not meet these requirements. The sealability of the sealants of the invention is at the same level, or perhaps even better, than the sealability of prior art Sealant C as shown by comparison of FIG. 4 to the right hand specimen of FIG. 3, but the new sealants have none of the disadvantages of Sealant C as described in detail above in section (c).

(e) Conclusion

The foregoing detailed description of thermally curable liquid sealants for impregnating and sealing pores and voids in cast metal articles and powdered metal articles sets forth new and useful sealants that meet high performance standards as to heat and chemical resistance and provide excellent sealing of metal articles. End users now have available sealants of these characteristics that are of low to moderate cost and substantially outperform prior art sealants of the same cost. The new sealants can be employed in various types of impregnating machines now commonly in use, so that neither machine modifications nor special equipment are required, no special processing steps as to washing are required, and the cure water does not need to be filtered as the sealants have lower viscosities resulting in much less contamination of cure water. Conversely, however, the cure water can be filtered, which allows the operator to re-use the cure water without contaminating the inhouse water supply or the sanitary sewer system. In addition, rinse water containing sealants of the invention can be treated, such as by settling in a holding tank or mechanically, to remove suspended solids, following which the water can be re-used.

The new sealants have been demonstrated to provide excellent sealing of porous metal articles as set forth in part (d) of this description. Further evidence of their outstanding sealability is the fact that the new sealants have achieved Military Approval coupled with the additional fact that the new sealants have earned the approval of Underwriter's Laboratory. Military Approval is required for sealants that are to be used to impregnate metal articles purchased for the Armed Forces of the United States, and stringent standards must be met before sealants can be qualified for this type of end use. Underwriter's Laboratory approval is required for sealants that are used to impregnate various metal articles, such as die cast aluminum meter bodies utilized in gasoline and jet fuel pumps. Military Approval and UL approval each are granted only after a sealant passes rigorous test procedures, and very few sealants have met the standards established by these testing authorities. For example, prior art Sealants A and B do not meet the requirements for Military Approval and UL approval. Prior art Sealant C meets both standards, but has other undesirable characteristics that inhibits its use which are not found with the new sealants of the invention, all as explained above.

The present sealants are a new combination of five specified polymerizable components mixed together in specific proportions so as to provide sealants of exceptional performance capabilities with respect to chemical and physical properties as well as sealability that are important to end users. The foregoing enabling description of the present invention is made in such full and complete detail as to enable those of ordinary skill in the art to understand and practice the invention, but it is anticipated that those skilled in the art will be able to devise changes to the described embodiments that will remain within the true spirit and scope of this invention.

I claim:

1. A thermally curable liquid sealant for impregnating and sealing pores of cast metal articles and powdered metal articles including polymerizable components consisting essentially of, on a percent by weight basis
   (1) about 25% to 40% of a polymerizable monofunctional methacrylate or acrylate monomer;
   (2) about 30% to 40% of a polymerizable polyfunctional dimethacrylate or diacrylate monomer ester of triethylene glycol, tripropylene glycol or tetraethylene glycol;
   (3) about 10% to 20% of a polymerizable polyfunctional dimethacrylate or diacrylate ester of diethylene glycol or dipropylene glycol;
   (4) about 5% to 15% of an unsaturated water emulsifiable polyester which is reactive with the acrylate monomers of components (1)-(3) to form a crosslinked solid upon curing, said polyester being formed by the reaction of adipic acid and fumaric acid with a mixture of polyols;
   (5) about 5% to 15% of a dicyclopentenyloxyethyl methacrylate or acrylate ester, said sealant having a viscosity of about 29 to 33 seconds as measured with a No. 1 Zahn cup at 72° C.

2. A thermally curable liquid sealant for metal articles according to claim 1 wherein the sealant includes about 30% to 35% of component (1).

3. A thermally curable liquid sealant for metal articles according to claim 1 wherein the sealant includes about 10% to 15% of component (3).

4. A thermally curable liquid sealant for metal articles according to claim 1 wherein the sealant includes about 8% to 13% of component (4).

5. A thermally curable liquid sealant for metal articles according to claim 1 wherein component (1) of the sealant is hydroxypropyl methacrylate.

6. A thermally curable liquid sealant for metal articles according to claim 1 wherein component (2) of the sealant is triethylene glycol dimethacrylate.

7. A thermally curable liquid sealant for metal articles according to claim 1 wherein component (3) of the sealant is diethylene glycol dimethacrylate.

8. A thermally curable liquid sealant for metal articles according to claim 1 wherein component (4) of the sealant is an unsaturated polyester of adipic acid and fumaric acid.

9. A thermally curable liquid sealant for metal articles according to claim 1 wherein component (5) of the sealant is dicyclopentenyloxyethyl methacrylate.

* * * * *